M. LOZO.
Egg-Beater.
No. 168,510.
Patented Oct. 5, 1875.
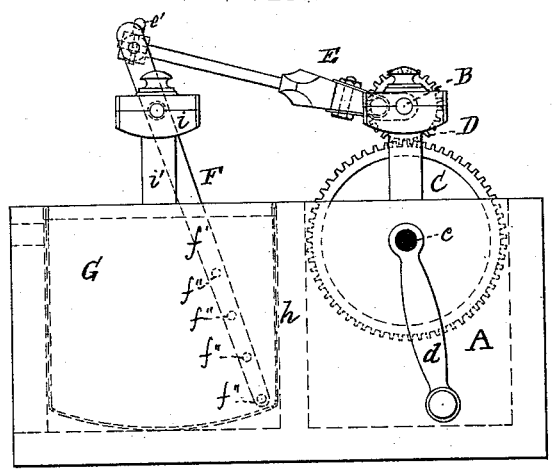
FIG. I
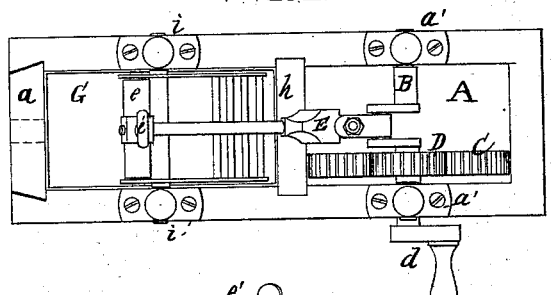
FIG. II
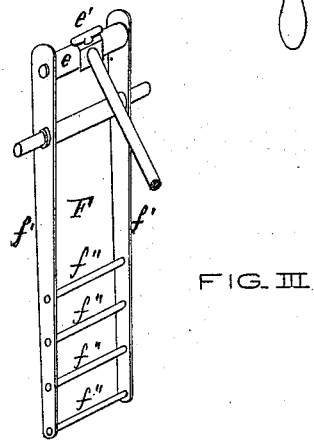
FIG. III
WITNESSES.
INVENTOR.
Martin Lozo
by G. H. W. T. Howard,
Attorney

UNITED STATES PATENT OFFICE.

MARTIN LOZO, OF CLAREMONT, NEW HAMPSHIRE.

IMPROVEMENT IN EGG-BEATERS.

Specification forming part of Letters Patent No. 168,510, dated October 5, 1875; application filed August 19, 1875.

*To all whom it may concern:*

Be it known that I, MARTIN LOZO, of Claremont, Sullivan county, New Hampshire, have invented certain Improvements in Egg-Beaters, of which the following is a specification, reference being had to the accompanying drawing forming a part hereof.

In the drawing referred to, Figure 1 is a side view of the invention. Fig. 2 is a top view of the same, and Fig. 3 a view in perspective of a detached portion thereof.

Similar letters of reference indicate similar parts of the invention.

A is a box open at the top, and provided at one end with a sliding door, $a$. B is a crank-shaft resting in bearings $a'$, and extending across the box, as shown. A gear-wheel, C, is placed upon a shaft, $c$, passing through and across the box, which wheel engages with a smaller wheel, D, secured to the crank-shaft B. The shaft $c$ is revolved by means of a crank and handle, $d$. One end of a connecting-rod, E, is secured to the crank of the shaft B, the other end of the rod being detachably connected to the upper round $e$ of the beater F. The beater consists of two bars, $f'$, and the pins $f''$. The center of the round $e$ is square, the end of the connecting-rod passing through it, and being held by the pin $e'$, which passes through a hole in the round and one in the end of the rod. A tin pan, G, is placed in the end of the box next to the door, the inner end of the pan fitting against the partition $h$ of the box. The beater rests in bearings $i$ standing upon supports $i'$, and is adapted to sweep the curved bottom of the pan. The eggs are opened and placed in the pan, and a quick vibratory movement given to the beater by the revolutions imparted to the crank by means of the gear-wheels and crank-handle. The vibratory movement of the beater quickly beats the eggs for purposes of the kitchen. When the operation of beating the eggs is completed the pin $e$ is withdrawn and the beater thus detached from the connecting-rod. The door $a$ is then raised and the pan left free to be drawn with its contents from the box.

This invention is principally designed for hotel uses, but is applicable, also, for the family kitchen.

I claim as my invention and wish to secure by Letters Patent of the United States—

The combination of the box A, removable pan G, beater F, detachable connecting-rod E, and its vibrating mechanism, substantially as and for the purposes specified.

In testimony whereof I have hereto subscribed my name this 10th day of July, 1875.

MARTIN LOZO.

Witnesses:
 HERMAN HOLT,
 EDWARD N. HOLT.